United States Patent Office 3,124,556
Patented Mar. 10, 1964

3,124,556
STABILIZING SYNTHETIC DIENE RUBBERS
Dudley B. Merrifield, Basking Ridge, N.J., and Rutherford B. Hill, St. Albans, W. Va., assignors to Monsanto Chemical Company, St. Louis, Mo., a corporation of Delaware
No Drawing. Filed Sept. 10, 1959, Ser. No. 839,084
5 Claims. (Cl. 260—45.7)

This invention relates to stabilizing unvulcanized synthetic diene rubbers by which is meant synthetic rubbers containing a major proportion of a diene hydrocarbon.

Diene synthetic rubbers lack the preservatives inherently present in natural rubber and the raw polymers must be protected from continued polymerization, cross-linking and resultant hardening. Apparently oxygen of the atmosphere promotes resinification of the raw polymers. Accordingly, it is common practice to incorporate a preservative or stabilizer at the site of manufacture. Phenyl beta-naphthylamine (PBN) is extensively used for this purpose but rubber containing PBN is not suitable for manufacturing light colored rubber goods because PBN stains the rubber. The present invention provides preservatives which, without discoloring the rubber, inhibit polymerization, cyclization, cross-linking and formation of insoluble gel fractions.

While salts of phosphorothioic acid have been widely used as antioxidants for lubricating oils, they fail to protect natural rubber and it has been demonstrated that salts used commercially in lubricating oil are useless for the protection of conventional sulfur vulcanized rubber articles. However, it has now been discovered that phosphorodithioic acids prevent hardening of unvulcanized synthetic diene polymer rubbers and do not discolor either the raw polymer or vulcanizates thereof compounded with white pigments. The phosphorodithioic acids useful in the practice of this invention may be represented by the general formula

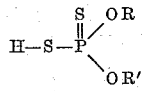

where R and R' represent phenyl, alkoxy substituted phenyl or alkyl substituted phenyl radicals.

The preservatives are preferably used in the form of their salts. The salts are more stable and unexplained failures of preservative effect occasionally observed in the same homologous series of acids may have been due to thermal instability. Some salts exert a strong cure activating effect during subsequent processing and reduce processing safety but others have been found which avoid this difficulty. For example, zinc salts leave an adequate margin of processing safety and are advantageous because they mix readily with the rubber. Salts which exert preservative action comprise alkali metal, ammonium, alkaline earth, zinc, cadmium, tin, lead and amine or substituted ammonium salts. Amines suitable for the preparation of substituted ammonium salts comprise 2,2′,2″ - nitrilotriethanolamine, triethylamine, t - butylamine, hexadecylamine, triethylenetetramine, N,N-dimethylaniline, cyclohexylamine, dicyclohexylamine, N-methylcyclohexylamine, N-ethylcyclohexylamine, p-phenetidine, N-cyclohexyl-o-hydroxyaniline, piperazine, hexamethylenetetramine, N-2-cyanoethylaniline, N-ethyl-p-phenetidine, dibutylamine, diamylamine, dioctylamine, diethanolamine, morpholine, dimethylamine, diethylamine, diisopropylamine and N-ethylaniline.

Examples of the new stabilizers comprise:

Ammonium O,O-di(p-bromophenyl) phosphorodithioate
Ammonium O,O-di(p-tolyl) phosphorodithioate
Zinc O,O-di(p-butylphenyl) phosphorodithioate
O,O-di(dichlorophenyl) S-hydrogen phosphorodithioate
O,O-di(p-dodecylphenyl) S-hydrogen phosphorodithioate
O,O-di(trichlorophenyl) S-hydrogen phosphorodithioate
O,O-di(p-anisyl) S-hydrogen phosphorodithioate
O,O-di(p-phenetyl) S-hydrogen phosphorodithioate As specific embodiments of the invention, the new stabilizers are added to styrene-butadiene copolymer rubber latex (SBR 1500 latex containing 23.5% bound styrene, no stabilizer, 19.9% solids) employing 1% on the dry rubber content. The dispersion is then coagulated by adding 26% NaCl solution followed by 5% sulfuric acid and the coagulum washed and dried. Samples of the rubber are then aged in a circulating air oven at 100° C. for the indicated times and the viscosity of specimens before and after aging determined by a Mooney plastometer. The instrument is described by Melvin Mooney, Industrial & Engineering Chemistry, Analytical Edition, March 14, 1934, pages 147–151, and the test procedure follows A.S.T.M method D–927. The viscosity of the unstabilized copolymer increases rapidly upon aging and after 48 hours is usually too hard and resinous for measuring meaningful viscosity. The stabilized product forms no resinous skin and retains a viscosity close to that of the unaged specimens. Some of the aged readings are actually lower than those of the unaged specimens, probably because of a mild peptizing action. The differences between viscosities before and after aging are a measure of the stabilizing action, little or no increase indicating high stabilizing activity. The results follow:

Table I

| Stabilizer | Increase in Mooney after Aging | |
|---|---|---|
| | 24 Hours | 48 Hours |
| None | 25 (ave.) | resinous |
| O,O-bis(2,4,6-trichlorophenyl) S-hydrogen phosphorodithioate | 3 | 0 |
| Triethyl ammonium O,O-bis(p-chlorophenyl) phosphorodithioate | 5 | 0 |
| t-Butyl ammonium O,O-bis(2,4-dichlorophenly) phosphorodithioate | 1 | 0 |
| Ammonium O,O-bis(p-anisyl) phosphorodithioate | 1 | 1 |

Properties of vulcanizable stock are illustrated by compounding stocks from rubber containing 1% stabilizer and comparing to a similar stock compounded from unstabilized coagulum. The compositions comprise Parts by weight
Rubber as coagulum from SBR 1500 latex _____ 100.0
Carbon black _____ 50.0
Zinc oxide _____ 4.0
Stearic acid _____ 2.0
Saturated hydrocarbon softener _____ 10.0
Sulfur _____ 1.75
N-cyclohexyl 2-benzothiazolesulfenamide _____ 1.2

Any tendency of the stocks to pre-vulcanize or scorch is evaluated by means of a Mooney plastometer at 135° C. This furnishes an indication of the time the stocks can be heated at this temperature before beginning to vulcanize. The end point is taken as the time for the Mooney plasticity value to rise ten points above the minimum. The properties of the vulcanizates are illustrated by curing in the usual manner in a press for 60 minutes at 144° C. The properties varied depending upon the stabilizer contained in the rubber from which the stocks were compounded.

*Table II*

| Stabilizer in Rubber From Which Stock were Compounded | Mooney Scorch Time (mins.) | Modulus of Elasticity in lbs./in.² at 300% Elong. | Ult. Tensile, lbs./in.² | Ult. Elong., Percent |
|---|---|---|---|---|
| None | 25.7 (ave.) | 1,600 | 3,050 | 550 |
| O,O-bis(2,4,6-trichlorophenyl) S-hydrogen phosphorodithioate. | 30.0 | 1,450 | 3,240 | 600 |
| Triethylammonium O,O-bis-(p-chlorophenyl)-phosphorodithioate. | 12.4 | 1,570 | 3,290 | 550 |
| Ammonium O-O-bis(p-anisyl) phosphorodithioate. | 27.4 | 1,160 | 3,240 | 600 |
| Phenyl beta-napththylamine | 22.0 | 1,820 | 3,330 | 520 |

Resistance to discoloration of the vulcanizates is demonstrated by compounding stocks from rubber containing 1% of stabilizer, vulcanizing and comparing to a similar vulcanizate prepared from unstabilized coagulum. The compositions comprise

|   | Parts by weight |
|---|---|
| Rubber as coagulum from SBR 1500 latex | 100.0 |
| Titanium dioxide | 50.0 |
| Clay | 75.0 |
| Polymerized coumarone-indene mixture | 10.0 |
| Stearic acid | 1.0 |
| Zinc oxide | 5.0 |
| Paraffin | 1.0 |
| Sulfur | 2.25 |
| 2,2'-dithiobis benzothiazole | 1.4 |
| Diphenyl guanidine | 0.4 |

The stocks are vulcanized by heating for 30 minutes in a press at 144° C. and the vulcanizates exposed to ultra violet light radiation from an S-1 sunlamp for ten days. The whiteness of the stocks after exposure is evaluated by a reflectance meter. This furnishes a measure of the percentage of incident light reflected from the surface of the stocks. The instrument is calibrated against magnesium oxide as 100%.

*Table III*

| Stabilizer in Rubber From which Stocks were Compounded | Percent Light Reflectance |
|---|---|
| None | 47 |
| O,O-bis (2,4,6-trichlorophenyl) S-hydrogen phosphorodithioate | 47 |
| Triethyl ammonium O,O-bis (p-chlorophenyl) phosphorodithioate | 53 |
| Ammonium O,O-bis (p-anisyl) phosphorodithioate | 52 |
| Phenyl beta-naphthylamine | 21 |

As still further specific embodiments of the invention, compositions containing 1.2% of stabilizer are prepared by adding the stabilizer to the coagulum from SBR 1500 latex. 1550 ml. of latex are mixed with 600 ml. of 10% salt solution and 1500 ml. of isopropyl alcohol in a Waring Blendor. The coagulum, which is in the form of small pellets, is filtered and dried. Several batches are mixed to secure uniformity and the stabilizer is then incorporated on a rubber mill employing 1.2% of the weight of the dry rubber. The compositions are sheeted out at a mill setting of 0.008 inch and placed on a sheet of tetrafluoroethylene polymer which in turn is placed on a raised metal screen in an ordinary baking pan. The pans are covered with glass, each sample being in a separate pan, and aged in an oven at 100° C. in circulating air. Mooney viscosities are determined after aging. In addition, the gel content is determined by weighing out 0.4 gram samples in 100 ml. of toluene containing 0.0075 gram of PBN per liter. The compositions are allowed to stand at least 24 hours, then filtered through a 100-mesh screen. The separated solids are washed with 10 ml. of toluene and the filtrate diluted to 118 ml. A 10 ml. sample is transferred to a tared evaporating dish and the sample evaporated to dryness by heating for 1 hour at 70° C. The weight of the sol rubber is recorded and the percent gel calculated by difference. The results are recorded in Table IV.

*Table IV*

| Stabilizer | Increase in Mooney After Aging | | Percent Gel After Aging 24 Hours |
|---|---|---|---|
|  | 8 Hours | 24 Hours |  |
| None | 60 | 73 | 52 |
| O,O-di(2,4-dichlorophenyl) S-hydrogen phosphorodithioate | 7 | 18 | 57 |
| O,O-di(4-dodecylphenyl) S-hydrogen phosphorodithioate | 1 | 5 | 1 |
| O,O-di(p-anisyl) S-hydrogen phosphorodithioate | 6 | 11 | 2 |
| Ammonium O,O-di(2,4-dichlorophenyl) phosphorodithioate | 1 | 0 | 20 |

Observation of samples prepared for determining Mooney viscosities recorded in Table IV shows that all stabilized samples are indistinguishable in color from the unstabilized control. All samples are light tan.

While a concentration of 1.0% provides an adequate margin of safety for most purposes, useful results are obtained with greater and lesser amounts. In general, amounts within the range of 0.01%–5.0% by weight of the rubber comprise the useful range. The incorporation of the stabilizer may be accomplished by adding the compound per se or in solution, suspension or emulsion to the rubber. The rubber may be in massed or dispersed form. Regardless of the method of incorporation, it is desirable to protect the rubber by adding the stabilizer soon after completing the polymerization. The stabilizers may be used in combination with other types of stabilizers. Moreover, mixtures of different phosphorodithioates may be employed. Use in conjunction with stabilizers which resist other kinds of degradation is advantageous, as for example for protecting vulcanizates from the action of ozone. Certain dialkyl phenol sulfide antioxidants are especially desirable for this purpose, as for example thiobis-(2,4-diamylphenol). The phosphorodithioates are believed to function by scavenging trace metal impurities in the rubber, especially iron. Iron in the trivalent state accelerates hardening of the rubber and is invariably present although in varying quantity.

The stabilizers protect sulfur vulcanizable synthetic diene rubbers. Such rubbers are prepared by polymerizing an aliphatic conjugated diene compound, as for example butadiene, isoprene, piperylene, dimethylbutadiene, ethylbutadiene, either alone or as the major component with monoolefinic compounds as the minor component which contain the $CH_2=C<$ group. Examples of suitable monoolefins are styrene, alpha-methylstyrene, monochlorostyrene, dichlorostyrene, vinyl naphthalene, vinyl biphenyl, vinyl carbazole, 2-vinyl-5-ethyl pyridine and methyl vinyl ketone. These rubbers includes polybutadiene, cis-polybutadiene, cis-polyisoprene and butadiene-styrene copolymer rubber.

It is intended to cover all changes and modifications of the examples of the invention herein chosen for purposes of disclosure which do not constitute departures from the spirit and scope of the invention.

What is claimed is:

1. A composition of matter comprising unvulcanized sulfur vulcanizable synthetic diene polymer rubber containing an aliphatic conjugated diene hydrocarbon as a major component of the polymer and a small but preservative amount of a compound effective to inhibit hardening selected from the group consisting of phosphorodithioic acids of the structure

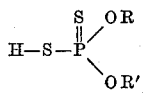

alkali metal, ammonium, alkaline earth metal, zinc cadmium, tin, lead, antimony III and substituted ammonium salts thereof, where R and R' each represent a phenyl radical.

2. Unvulcanized styrene-butadiene copolymer having incorporated therein a small but preservative amount of ammonium O,O-bis(p-anisyl) phosphorodithioate.

3. Unvulcanized styrene-butadiene copolymer having incorporated therein a small but preservative amount of ammonium O,O - di(2,4 - dichlorophenyl) phosphorodithioate.

4. Unvulcanized styrene-butadiene copolymer having incorporated therein a small but preservative amount of O,O-bis(p-alkylphenyl) S-hydrogen phosphorodithioate.

5. Unvulcanized styrene-butadiene copolymer having incorporated therein a small but preservative amount of O,O-bis(trichlorophenyl) S-hydrogen phosphorodithioate.

References Cited in the file of this patent
UNITED STATES PATENTS

| | | |
|---|---|---|
| 2,488,975 | Hunter | Nov. 22, 1949 |
| 2,538,355 | Davis et al. | Jan. 16, 1951 |
| 2,739,123 | Kennerly et al. | Mar. 20, 1956 |
| 2,884,405 | Downey | Apr. 28, 1959 |
| 2,906,731 | Hill et al. | Sept. 29, 1959 |